United States Patent
Blackman

(10) Patent No.: US 10,086,595 B2
(45) Date of Patent: Oct. 2, 2018

(54) METHOD FOR FORMING PACKAGING MATERIAL, PACKAGING MATERIAL AND USE THEREOF

(71) Applicant: AMCOR FLEXIBLES UK LIMITED, Bristol (GB)

(72) Inventor: Paul Blackman, Ibstock (GB)

(73) Assignee: AMCOR FLEXIBLES UK LIMITED (GB)

( * ) Notice: Subject to any disclaimer, the term of this patent is extended or adjusted under 35 U.S.C. 154(b) by 0 days.

(21) Appl. No.: 15/120,801

(22) PCT Filed: Mar. 3, 2015

(86) PCT No.: PCT/EP2015/000477
§ 371 (c)(1),
(2) Date: Aug. 23, 2016

(87) PCT Pub. No.: WO2015/131996
PCT Pub. Date: Sep. 11, 2015

(65) Prior Publication Data
US 2016/0368257 A1    Dec. 22, 2016

(30) Foreign Application Priority Data

Mar. 5, 2014 (EP) .................................. 14000781

(51) Int. Cl.
*B32B 38/00* (2006.01)
*B32B 37/04* (2006.01)
(Continued)

(52) U.S. Cl.
CPC ............ *B32B 38/145* (2013.01); *B32B 27/08* (2013.01); *B32B 27/32* (2013.01); *B32B 37/04* (2013.01);
(Continued)

(58) Field of Classification Search
CPC ... B32B 37/04; B32B 38/145; B32B 2439/70; B32B 27/08; B32B 27/32;
(Continued)

(56) References Cited

U.S. PATENT DOCUMENTS

| | | | | |
|---|---|---|---|---|
| 2005/0019591 A1* | 1/2005 | Francois | ................ | B32B 7/06 428/458 |
| 2010/0040875 A1* | 2/2010 | Patel | ................ | B29C 55/18 428/338 |
| 2012/0291377 A1* | 11/2012 | Riebel | ................ | B32B 27/36 52/232 |

FOREIGN PATENT DOCUMENTS

| | | | | |
|---|---|---|---|---|
| GB | 2282348 | | 4/1995 | |
| GB | 2282348 A | * | 4/1995 | ............ B32B 27/16 |
| WO | 2007062281 | | 5/2007 | |

OTHER PUBLICATIONS

International Search Report and Written Opinion of the International Searching Authority for International Application No. PCT/EP2015/000477, dated Mar. 15, 2015, 9 pages.

* cited by examiner

*Primary Examiner* — Vishal I Patel
(74) *Attorney, Agent, or Firm* — RatnerPrestia

(57) ABSTRACT

The present invention relates to a method for forming a packaging material used to produce a product package having at least partly a print layer visible from the outside of the product package. The method comprises the following steps, a first film having a base layer is provided whereby the print layer is printed on one side of the base layer by reverse digital printing. A second film having at least the following two layers, a base layer whereby a core layer is coated on one side of the base layer by extrusion coating. The first and the second film are then thermally laminated.

14 Claims, 4 Drawing Sheets

Figure 1A:
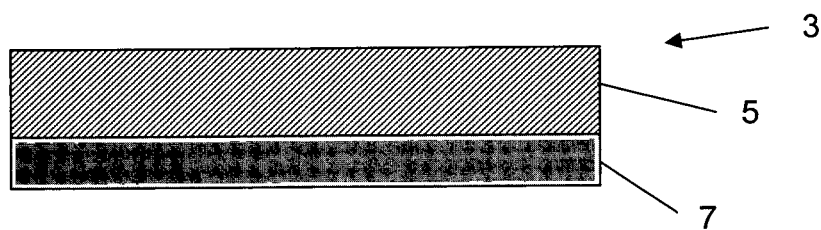

(51) Int. Cl.
*B32B 27/08* (2006.01)
*B32B 27/32* (2006.01)

(52) U.S. Cl.
CPC ....... *B32B 2255/10* (2013.01); *B32B 2255/26* (2013.01); *B32B 2307/412* (2013.01); *B32B 2307/518* (2013.01); *B32B 2307/75* (2013.01); *B32B 2439/70* (2013.01)

(58) Field of Classification Search
CPC ............ B32B 2255/10; B32B 2255/26; B32B 2307/412; B32B 2307/518; B32B 2307/75
See application file for complete search history.

METHOD FOR FORMING PACKAGING MATERIAL, PACKAGING MATERIAL AND USE THEREOF

CROSS-REFERENCE TO RELATED APPLICATIONS

This is the national phase of International Application No, PCT/EP2015/000477, filed 3 Mar. 2015, which claims priority from French Application No. 14000781.6, filed 5 Mar. 2014. The disclosure of each of these applications is incorporated herein by reference in its entirety for all purposes.

FIELD OF THE INVENTION

The present invention relates to a method for forming packaging materials and packaging materials.

DISCUSSION OF THE RELATED ART

Printed packaging material is widely used in industry. In particular consumer goods such as food and beverages are usually stored and distributed in containers made of semi-rigid or flexible packaging materials which often have a multi-layered structure. There are various methods to print flexible packaging materials including flexographic and rotogravure. Flexographic printing is an indirect printing method using a printing plate as template. Rotogravure printing is an indirect printing method using an engraved cylinder as template. However, in cases where very low quantities of the printed material are needed, these printing methods can be rather uneconomic. A versatile and potentially more economic printing method for very low quantities of flexible packaging materials is digital printing. This printing method refers to methods of printing from a digital-based image directly to a variety of media. In contrast to more traditional printing techniques digital printing does not require the preliminary manufacturing step of creating a printing plate or engraved cylinder, i.e. the making and replacing of printing plates during the printing process is omitted. Drawbacks of the digital printing process currently are the relatively slow speed (approximately 40 m per minute) and its restriction to relatively narrow webs (500 mm or less). Conversely the multi-layered structures of flexible packaging materials use production techniques, e.g. extrusion lamination which run at much faster speeds and use wider webs. Therefore, digital printing is not suitable to be directly employed in the production of these packaging materials. For the production of packaging materials used for presentation purposes or special editions of a product only lower quantities of said packaging materials are required. It is therefore highly desirable to employ a versatile printing technique as digital printing in the production of such packaging materials.

The object of the present invention is to provide a method for the production of packaging materials that overcomes the above mentioned drawbacks and allows the use of digital printing in the production of packaging materials.

SUMMARY OF THE INVENTION

The object is achieved by a method for forming packaging materials according to the present invention as defined in claim 1. A packaging material according to claim 12 and a use of such packaging materials according to claim 13 are also provided. Further preferred embodiments are subject to the dependent claims.

A method for forming a packaging material that is used to produce a product package which has at least partly a print layer that is visible from the outside of said product package comprises the following steps, in a first step two films are provided. Both films have a layered structure. The first film comprises a base layer and a print layer. The print layer has been printed on the base layer by reverse digital printing. The second film comprises at least two layers. The second film comprises a base layer and in addition a core layer. The core layer is arranged on the base layer by extrusion coating. In a subsequent step the first film and the second film are thermally laminated whereby the print layer or an optionally present primer layer of the first film contacts the core layer or an optionally present coating layer of the second film. The thermally laminated first film and the second film form the packaging material.

DETAILED DESCRIPTION OF CERTAIN EMBODIMENTS OF THE INVENTION

The method for forming a packaging material advantageously allows the use of reverse digital printing in the production of said packaging materials. In addition, the packaging materials may be produced in low quantities at relatively low costs compared to other printing techniques such as flexographic or gravure printing which becomes overly expensive and uneconomic when used for low quantities. Various prints may be included in the packaging materials as needed, e.g. for presentation purposes, for limited edition purposes etc. A significant part of the invention is that the subsequent lamination of the first and second film be a thermal lamination. By using this method it is possible to manufacture the first and the second film separately. Further, this allows using two or more first films in parallel being laminated to a second film, as the width of the first film comprising the print layer is limited by the width of the printing heads of the printing devices, e.g. inkjet printing devices. Inkjet printing is a preferred printing method.

In a preferred embodiment the method for forming a packaging material the first film and the second film are independently produced and provided as separate webs that are subsequently joined together. This allows two or more first films carrying a print are joined two one second film.

In another preferred embodiment at least two first films which are arranged in parallel are subsequently laminated to the second film to form the packaging material. In this respect it is possible to use two or more first films that are restricted in width by the digital printing technique with second films that can and are produced by extrusion coating in a greater width, e.g. four meters width. This improves on the one hand the production efficiency and reduces on the other hand the costs.

In a further preferred embodiment the second film comprises at least four layers. The second film comprises also a base layer and in addition a core layer. The core layer has a coating layer arranged on both sides. That is, a first coating layer is arranged on one side of the core layer and a second coating layer is arranged on the opposite side of the core layer. The coating layers and the core layer interposed between the first and the second coating layer are arranged on the base layer by co-extrusion coating whereby the first coating layer contacts the base layer of the second film. In a subsequent step the first film and the second film are thermally laminated whereby the print layer or an optionally present primer layer on top of the print layer of the first film contacts the second coating layer of the second film.

In a further embodiment the second film has two layers. On the base layer, of the second film is a core layer is arranged. The core layer preferably comprises a polyethylene with suitable adhesion to the base layer and suitable for thermal lamination to the first film.

In a third embodiment the second film has six layers. On the base layer of the second film is a first coating layer which is comprised of a polyethylene with suitable adhesion to the base layer, a core layer which is interposed between two additional coating layers and the second coating layer suitable for thermal lamination to the first film. The additional coating layers are directly arranged on the core layer. The core layer comprises a barrier polymer whereas the additional coating layers comprise polymers that provide adherence to the first coating layer and the second coating layer which surround that interface with the additional coating layers.

In another preferred embodiment the first film comprises in addition to the base layer and the print layer a primer layer which is coated on one side of the base layer of the first film. The print layer is subsequently printed by reverse digital printing on the primer layer. In this respect the primer layer improves the bonding between the base layer and the print layer. The print layer may comprise one or more inks or colours.

In a further preferred embodiment the additional primer layer is coated on the print layer. Thereby the print layer is protected and the adhesion of the first film to the second film is improved.

In another preferred embodiment the first film comprises two primer layers. The first primer layer is again coated on the base layer. The print layer is then arranged on the first primer layer by reverse digital printing. The second primer layer is arranged on the print layer which is thus interposed between the two primer layers. This is a combination of the preferred embodiments of the first film described above.

In a preferred embodiment the second film consists of four layers. These layers are the base layer, the core layer which is interposed between the first coating layer and the second coating layer.

The base layer of the second film comprises metalized bi-axially oriented polypropylene (BOPP). Further materials that the base layer may comprise of include polyethylene terephtalate (PET), polyethylene (PE), cast polypropylene (cPP) and nylon (oriented polyamide [OPA]), aluminium foil (Al), paper and cellophane or combinations thereof. Cellophane is a thin, transparent sheet made of regenerated cellulose. It has a low permeability to air, oils, greases, bacteria and water. Transparent barrier materials such as silicon oxide ($SiO_x$) or aluminium oxide ($AlO_x$), non transparent barrier materials or colored films may also be used. Preferred materials the base layer of the second film may comprise of are BOPP, PET, paper and cellophane, especially preferred is metalized BOPP. The core layer of the second film comprises a barrier polymer, preferably ethylene vinylalcohol copolymer (EVOH). Barrier polymers are polymers that have a low permeability for a given substance or group of substances. Barrier polymers are used in packaging applications to prevent the egress of contents or the ingress of unwanted substances, such as oxygen or carbon dioxide.

In a further embodiment the core layer of the second film comprises polypropylene (PP) whereas the first and the second coating layer which are arranged on opposite sides of the core layer comprise polyethylene. Polyethylene (PE). Polyethylene describes a huge family of resins obtained by polymerizing ethylene gas. This thermoplastic polymer is available in a range of flexibilities and other properties depending on the production process, with high density materials being the most rigid. Polyethylene can be formed by a wide variety of thermoplastic processing methods and is particularly useful where moisture resistance and low cost are required. Low density polyethylene typically has a density value ranging from 0.91 to 0.925 $g/cm^3$, linear low density polyethylene has a density in the range of 0.918 to 0.94 $g/cm^3$, while high density polyethylene ranges from 0.935 to 0.96 $g/cm^3$ and above. Polypropylene (PP) is a thermoplastic polymer used in a wide variety of applications including packaging. Most commercial polypropylene is isotactic and has an intermediate level of crystallinity between that of low-density polyethylene (LDPE) and high-density polyethylene (HDPE). However, different polymers or combinations of polymers can be used provided these polymers or combinations thereof are suitable for thermal lamination.

In another preferred embodiment the base layer of the first film comprises bi-axially oriented polypropylene. The use of polyethylene terephtalate (PET) is also possible. Further materials that the base layer may comprise of include polyethylene (PE), cast polypropylene (cPP) and nylon (oriented polyamide [OPA]), aluminium foil (Al), paper and cellophane or combination thereof. It is essential that the material used is suitable for digital printing and in addition suitable for thermal lamination. Preferred materials the base layer of the second film may comprise of are BOPP, PET, paper and cellophane, especially preferred is BOPP.

In preferred embodiment the reverse digital printing is achieved by inkjet printing.

The packaging material made according to method of the present invention may be used for forming food product packages.

Figure 1B:
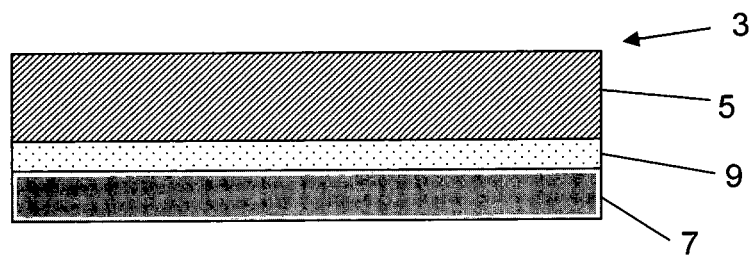
Figure 1C:
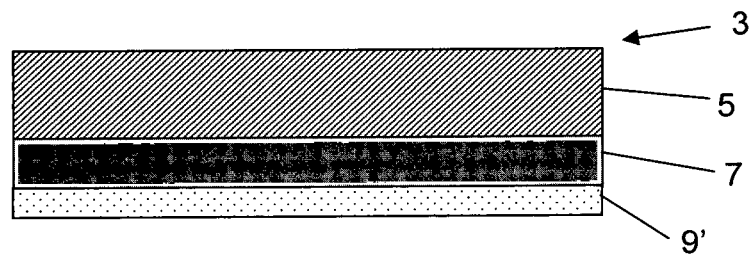
Figure 1D:
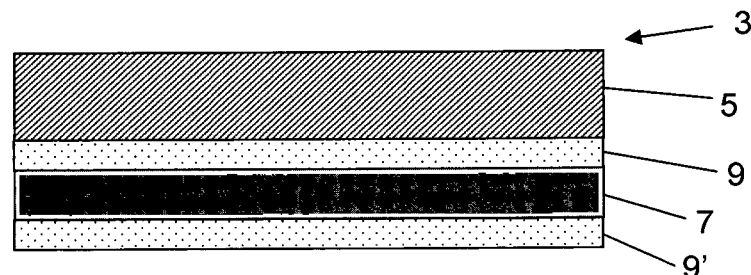
Figure 2A:
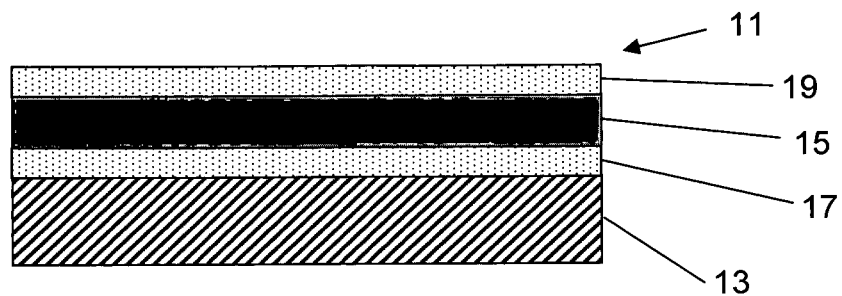
Figure 2B:
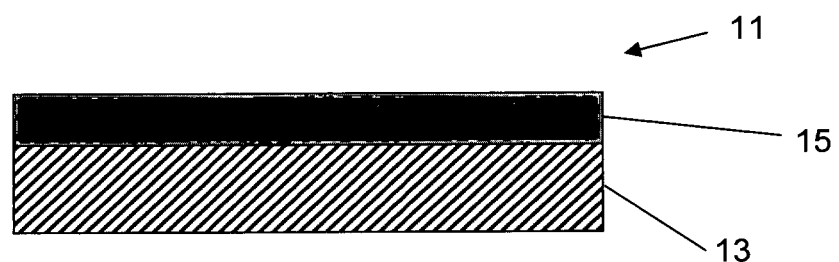
Figure 2C:
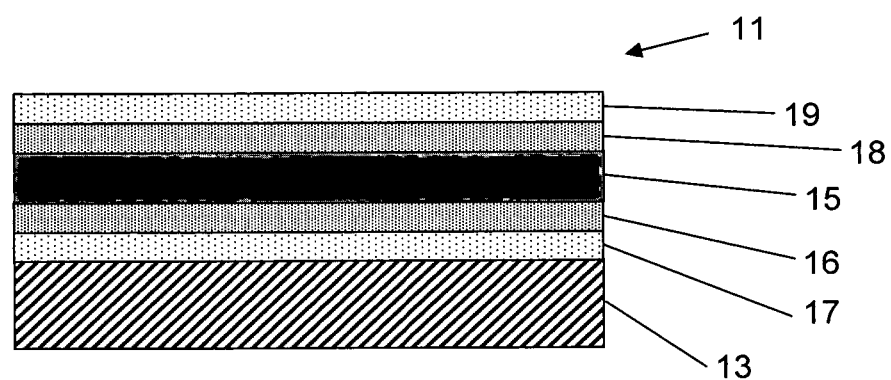
Figure 3:
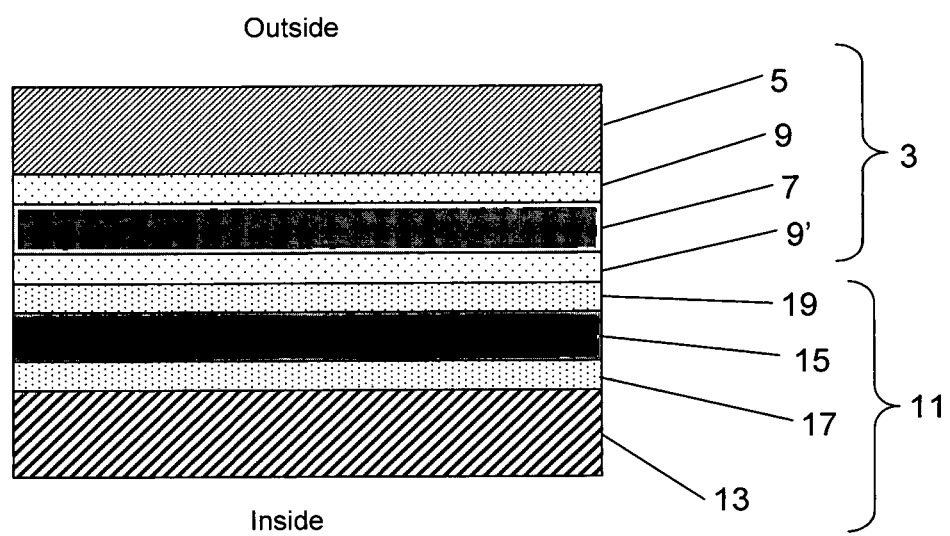
Figure 4:
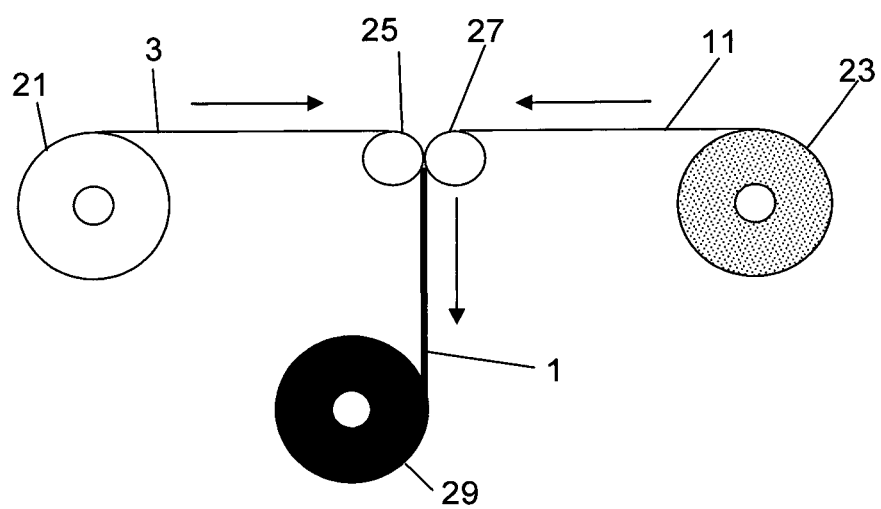

The method for forming packaging materials and the packaging materials according to the present invention are explained in more detail below with reference to exemplary embodiments in the drawings, in which, purely schematically:

FIG. 1A shows a first embodiment of the first film;
FIG. 1B shows a second embodiment of the first film;
FIG. 1C shows a third embodiment of the first film;
FIG. 1D shows a fourth embodiment of the first film;
FIG. 2A shows an embodiment of the second film;
FIG. 2B shows a second embodiment of the second film;
FIG. 2C shows a third embodiment of the second film;
FIG. 3 shows an embodiment of the packaging material;
FIG. 4 shows the step of thermal lamination of the first and the second film.

FIG. 1A shows an embodiment of the first film 3 that comprises a base layer 5 whereby a print layer 7 is arranged on one side of the base layer 5. An especially preferred material for the base layer 5 is BOPP. The print layer 7 may comprise one or more inks or colours.

FIG. 1B shows a second embodiment of the first film 3. In this embodiment there is a primer layer 9 arranged between the base layer 5 and the print layer 7. The primer layer 9 improves the bonding between the print layer 7 and the base layer 5.

FIG. 1C shows a third embodiment of the first film 3 whereby a primer layer 9' is arranged on the print layer 7 which itself is directly arranged on the base layer 5.

FIG. 1D shows a further preferred embodiment of the first film 3 which comprises the base layer 5, a first primer layer 9, the print layer 7 and a second primer layer 9'. The embodiment combines two primer layers 9, 9'. The first primer layer 9 is coated on the base layer 5. The print layer 7 is arranged on the first primer layer 9. The second primer layer 9' is arranged on the print layer 7 which is thus arranged and protected between the first and the second primer layer 9,9'.

FIG. 2A shows an embodiment of the second film 11. The second film 11 has four layers. On the base layer 13 of the second film 11 a core layer 15 that is interposed between a first coating layer 17 and a second coating layer 19. The base layer 13 thus contacts the first coating layer 17. The base layer 13 preferably comprises metalized BOPP. The core layer 15 preferably comprises polypropylene whereas the first and the second coating layer 17, 19 both comprise a polyethylene that has a suitable adhesion to the base layer 13 and that is also suitable for thermal lamination to the first film 3.

FIG. 2B shows a second embodiment of the second film 11. The second film 11 has two layers. On the base layer 13 of the second film 11 is a core layer 15 is arranged. The core layer 15 preferably comprises a polyethylene with suitable adhesion to the base layer 13 and suitable for thermal lamination to the first film 3.

FIG. 2C shows a third embodiment of the second film 11. In this embodiment the second film 11 has six layers. On the base layer 13 of the second film 11 is a first coating layer 17 which is comprised of a polyethylene with suitable adhesion to the base layer 13, a core layer 15 which is interposed between two additional coating layers 16 and 18 and the second coating layer 19 suitable for thermal lamination to the first film 3. The additional coating layers 16 and 18 are directly arranged on the core layer 15. The core layer 15 comprises a barrier polymer whereas the additional coating layers 16 and 18 comprise polymers that provide adherence to the first coating layer 17 and the second coating layer 19 which surround that interface with the additional coating layers 16 and 18.

FIG. 3 shows an embodiment of the packaging material 1. The first film 3 (shown in FIG. 1A) and the second film 11 (shown in FIG. 2A) are joined together by thermal lamination and yield the multi-layered packaging material 1. The different layers are in order from inside to outside, the base layer 13 of the second film 11, the first coating layer 17, the core layer 15, the second coating layer 19, the primer layer 9', the print layer 7, the primer layer 9 and the base layer 5 of the first film 3. The first film 3 and the second film 11 contact between the primer layer 9' of the first film and the second coating layer 19 of the second film 11 whereas the base layer 5 of the first film 3 interfaces the outside and the base layer 13 of the second film 11 interfaces the inside of a package (not shown).

FIG. 4 illustrates the step of thermal lamination of the first film 3 and the second film 11. The first film 3 and the second film 11 are both rolled up and provided as first web 21 and second web 23. Subsequently the first web 21 and the second web 23 are unwound and the first film 3 and the second film 11 pass between two counter rotating pressure rolls 25, 27 and are thermally laminated to form the packaging material 1 which itself is rolled up on a web 29.

The invention claimed is:

1. A method for forming a packaging material used to produce a product package having at least partly a print layer visible from the outside of the product package, comprising the steps of:
   providing a first film having a base layer of the first film whereby the print layer is printed on one side of the base layer by reverse digital printing,
   providing a second film having at least two layers, a base layer and a core layer and having a greater width than that of the first film, whereby the core layer is coated on one side of the base layer of the second film by extrusion coating,
   the first film and the second film are subsequently thermally laminated, whereby the print layer of the first film contacts the core layer of the second film to form the packaging material, and whereby at least two first films arranged in parallel are subsequently thermally laminated to the second film to form the packaging material.

2. The method according to claim 1, whereby the first film and the second film are independently produced and provided as a separate web.

3. The method according to claim 1, whereby the second film has at least four layers and the base layer and whereby the core layer having a first coating layer on one side and a second coating layer on the opposite side is coated on one side of the base layer by co-extrusion coating.

4. The method according to claim 1, whereby a primer layer is coated on one side of the base layer of the first film and subsequently the print layer is printed by reverse digital printing on the primer layer.

5. The method according to claim 1, whereby a primer layer is coated on the print layer of the first film.

6. The method according to claim 1, whereby the second film consists of four layers.

7. The method according to claim 1, whereby the core layer of the second film comprises polypropylene and the first and second coating layer of the second film comprise polyethylene.

8. The method according to claim 1, whereby the base layer of the first film comprises bi-axially oriented polypropylene.

9. The method according to claim 1, whereby the base layer of the second film comprises metalized bi-axially oriented polypropylene.

10. The method according to claim 1, whereby the digital reverse printing is achieved by using an inkjet printing device.

11. A packaging material made according to the method of claim 1.

12. A method for forming a food product package, comprising using the packaging material according to claim 11.

13. The method according to claim 1, wherein the first film further comprises a primer layer arranged on the side of the print layer opposite to the side on which the base layer of the first film is arranged.

14. The method according to claim 1, wherein the second film further comprises a coating layer arranged on the side of the core layer opposite to the side on which the base layer of the second film is arranged.

* * * * *